(12) United States Patent
Wei et al.

(10) Patent No.: US 9,481,445 B2
(45) Date of Patent: Nov. 1, 2016

(54) CONNECTION DEVICE FOR MEANS OF AIRPLANE

(71) Applicant: AIRBUS S.A.S., Blagnac (FR)

(72) Inventors: Gang Wei, Beijing (CN); Juan Feng, Beijing (CN)

(73) Assignee: AIRBUS S.A.S., Blagnac (FR)

( * ) Notice: Subject to any disclaimer, the term of this patent is extended or adjusted under 35 U.S.C. 154(b) by 27 days.

(21) Appl. No.: 14/535,813

(22) Filed: Nov. 7, 2014

(65) Prior Publication Data

US 2015/0129714 A1 May 14, 2015

(30) Foreign Application Priority Data

Nov. 8, 2013 (CN) .......................... 2013 1 0553367

(51) Int. Cl.
*B64C 3/28* (2006.01)

(52) U.S. Cl.
CPC ............ *B64C 3/28* (2013.01); *Y10T 403/7045* (2015.01)

(58) Field of Classification Search
CPC ....................... Y02T 50/433; Y02T 403/7045
USPC ................................................. 244/131, 132
See application file for complete search history.

(56) References Cited

U.S. PATENT DOCUMENTS

| | | | | |
|---|---|---|---|---|
| 4,904,109 A * | 2/1990 | Anderson | .................. | B64C 1/12 244/132 |
| 5,236,151 A * | 8/1993 | Hagle | ...................... | B64C 1/38 244/117 A |
| 6,224,339 B1 * | 5/2001 | Rhodes | ................... | F01D 5/186 244/132 |
| 6,871,822 B2 * | 3/2005 | Guard | ..................... | B64C 1/066 244/119 |
| 7,037,568 B1 * | 5/2006 | Rogers | ................ | B29C 65/5057 244/131 |
| 7,931,234 B2 * | 4/2011 | Maenz | ...................... | B64C 5/06 244/118.1 |
| 8,016,230 B2 * | 9/2011 | Fogarty | ................. | B29C 65/505 244/117 R |

* cited by examiner

Primary Examiner — Brian M O'Hara
Assistant Examiner — Keith L Dixon
(74) Attorney, Agent, or Firm — Hauptman Ham, LLP

(57) ABSTRACT

The disclosure disclosed a connection device for connecting first means of the airplane to second means of the airplane. The first means and the second means are provided with connection regions, which lengthwise extend in a first direction and are connected with each other, respectively. A plurality of finger-like grooves, which are parallel with each other and extend respectively in a second direction inclined relative to the first direction in which the connection region extends, are provided respectively on a connection face of the connection region of the first means and a connection face of the connection region of the second means. Wherein the plurality of finger-like grooves are formed in such a manner that a finger-like protrusion is formed between adjacent finger-like grooves, when fitted, the finger-like protrusions of one of the first means and the second means is inserted into the corresponding finger-like grooves of the other one of the first means and the second means, thereby the first means and the second means are fixedly connected.

8 Claims, 8 Drawing Sheets

CONNECTION DEVICE FOR MEANS OF AIRPLANE

RELATED APPLICATIONS

The present application claim priority from Chinese Application No. 201310553367.1, filed Nov. 8, 2013, the disclosure of which is hereby incorporated by reference herein in its entirety.

FIELD OF THE INVENTION

The present disclosure relates to a connection device for connecting a main member and an accessory member of an airplane, particularly, relates to connection device for connecting a separable trailing edge of a flap, an aileron, an elevator, a rudder of the airplane to its main member. The present disclosure also relates to connection device for connecting the fairing (for example, wingtip fairing) to its main member.

BACKGROUND OF THE INVENTION

During taking off and landing of an airplane, since the trailing edge of the flap usually subjected to the collision of objects from the ground, the probability that the trailing edge of the flap is damaged is higher. In this case, the trailing edges of the flaps of all of the large airplanes are designed in a separable form, and then the trailing edge of the flap 1 is connected with the main member 2 of the flap by rivets 3, as shown in FIG. 1, so as to be replaced by itself when repairing, wherein the trailing edge of the flap is, for example, an aux-spar which is made of three pieces of sheet metal, which are bonded or welded together.

In the connection region of the main member of the flap and the trailing edge of the flap, there are about several hundreds of rivets along the spanwise direction. When the trailing edge needs to be replaced during a repairing process, all the rivets will be removed and reinstalled, and a new trailing edge is connected to the main member using larger type of rivets. There are following disadvantages in the prior art: a. over many rivets make repairing process is a heavy workload and will take too much time; b. the risk that the main member of the flap is damaged is increased; c. it is necessary to operate by experienced technical workers; d. the weight of the airplane is increased per repair.

SUMMARY OF THE INVENTION

In order to overcome above disadvantages, the disclosure provides a connection device in an insertion connection form, which is easy to install and disassemble when repairing so that the repair cost can be reduced, no damage occurred to the main member when replacing the trailing edge, and loads can be well distributed.

According to one aspect of the disclosure, a connection device for connecting first means of the airplane to second means of the airplane is provided. The first means and the second means may be respectively provided with connection regions, which lengthwise extend in a first direction and are connected with each other. A plurality of finger-like grooves, which are parallel with each other and extend respectively in a second direction inclined relative to the first direction in which the connection region extends, may be provided respectively on a connection face of the connection region of the first means and a connection face of the connection region of the second means. The plurality of finger-like grooves may be formed in such a manner that a finger-like protrusion is formed between adjacent finger-like grooves. When fitted, the finger-like protrusions of one of the first means and the second means may be inserted into the corresponding finger-like grooves of the other one of the first means and the second means, thereby the first means and the second means are fixedly connected.

Preferably, the finger-like grooves may not extend throughout the corresponding connection regions in a third direction substantially perpendicular with the first direction and the second direction, and the concave depths of the finger-like grooves in the third direction may be substantially identical.

Preferably, the first means may be a main member, and the second means may be an accessory member which may be designed into at least two segments in a lengthwise direction of the accessory member, wherein the angle between the second direction and the first direction alternately changed in an acute angle α and an obtuse angle β in each segment, and the at least two segments of the accessory member may be fixed together to form a single piece.

Preferably, the accessory member may be designed into two segments, and the second direction, in which the finger grooves of two portions, which are respectively corresponding to the two segments of the accessory member, on the main member extends, is toward an engaging face between the two segments of the accessory member, such that the two segments of the accessory member may be inserted into the main member, correspondingly, when fitted.

Preferably, the shape of the cross-section of the plurality of finger-like grooves in a direction substantially perpendicular to the second direction may be arranged so as to provide an interference fit between the respective connection faces.

Preferably, the shape of the plurality of finger-like grooves may be designed such that the widths of the plurality of finger-like grooves become larger at the end of the plurality of finger-like grooves in the second direction.

Preferably, the first means and the second means are connected together by means of fixing means in the connection region in the first direction.

Preferably, after fitted, there may be gaps between the ends of the plurality of finger-like grooves in the second direction and the inserted corresponding finger-like protrusions, respectively. Wherein, the sizes of the gaps gradually increase from the middle of the main member to the two ends of the main member in the first direction.

Preferably, the first means may be a main body of a flap, an aileron, an elevator or a rudder of the airplane, and the second means may be a separable trailing edge of the flap, the aileron, the elevator or the rudder of the airplane.

Preferably, the second means may be a fairing of the airplane, and the first means may be a main body with the fairing.

DESCRIPTION OF THE DRAWINGS

Embodiments of the present disclosure will now be described by way of example only with reference to the accompanying schematic drawings of which.

DETAILED DESCRIPTION

Herein below, the connection device according to the disclosure is described through a connection device for a flap of the airplane as a preferred embodiment. It should be noticed that the flap of the airplane is merely exemplary, and the following described embodiment does not limit the invention. The connection device according to the disclosure can be applied to a flap, an aileron, an elevator, a rudder or a fairing, etc. of the airplane.

Figure 1:
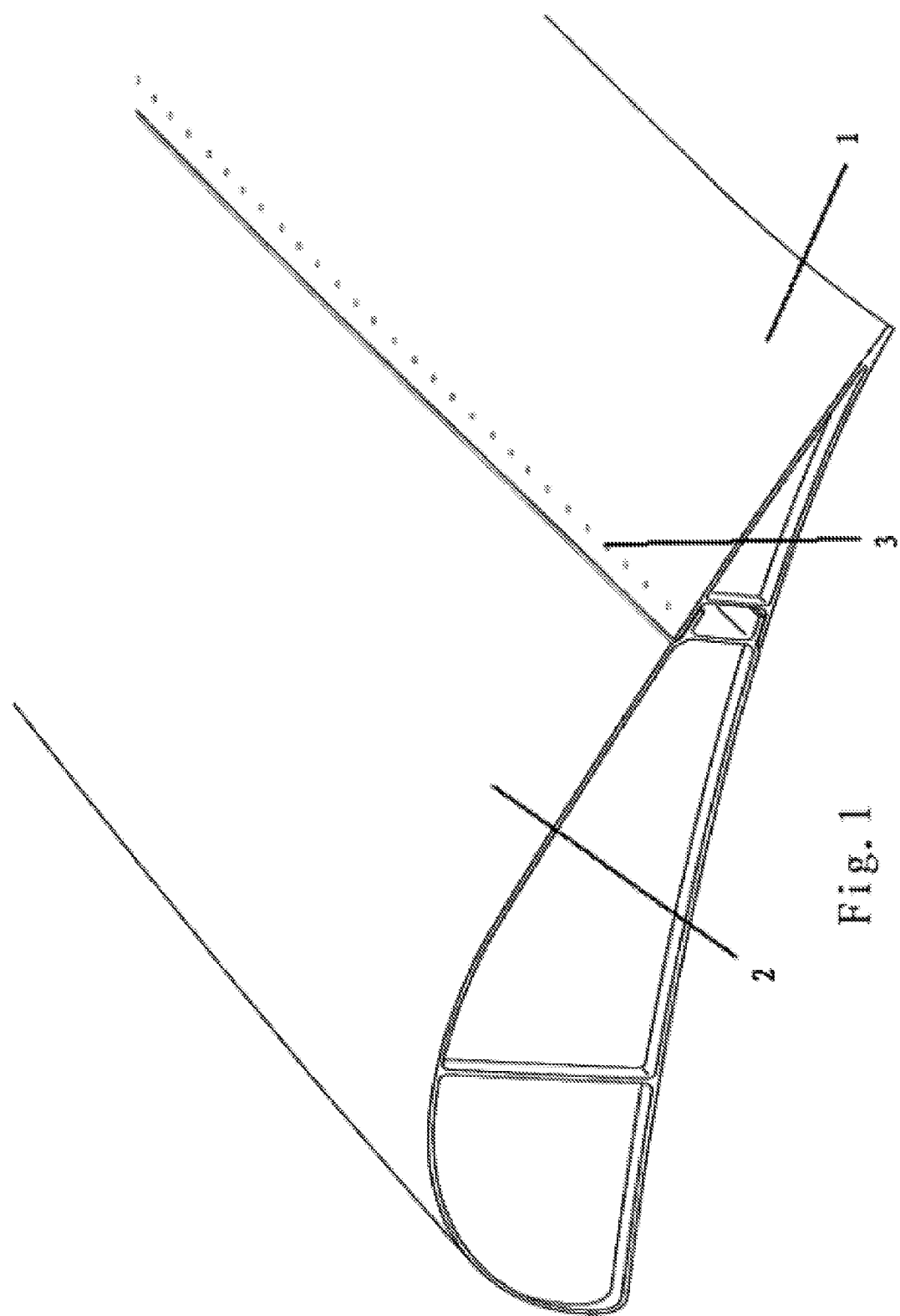
FIG. 1 shows the structure for connecting the trailing edge of the flap and the main member of the flap by rivets in the prior art.
Figure 2:
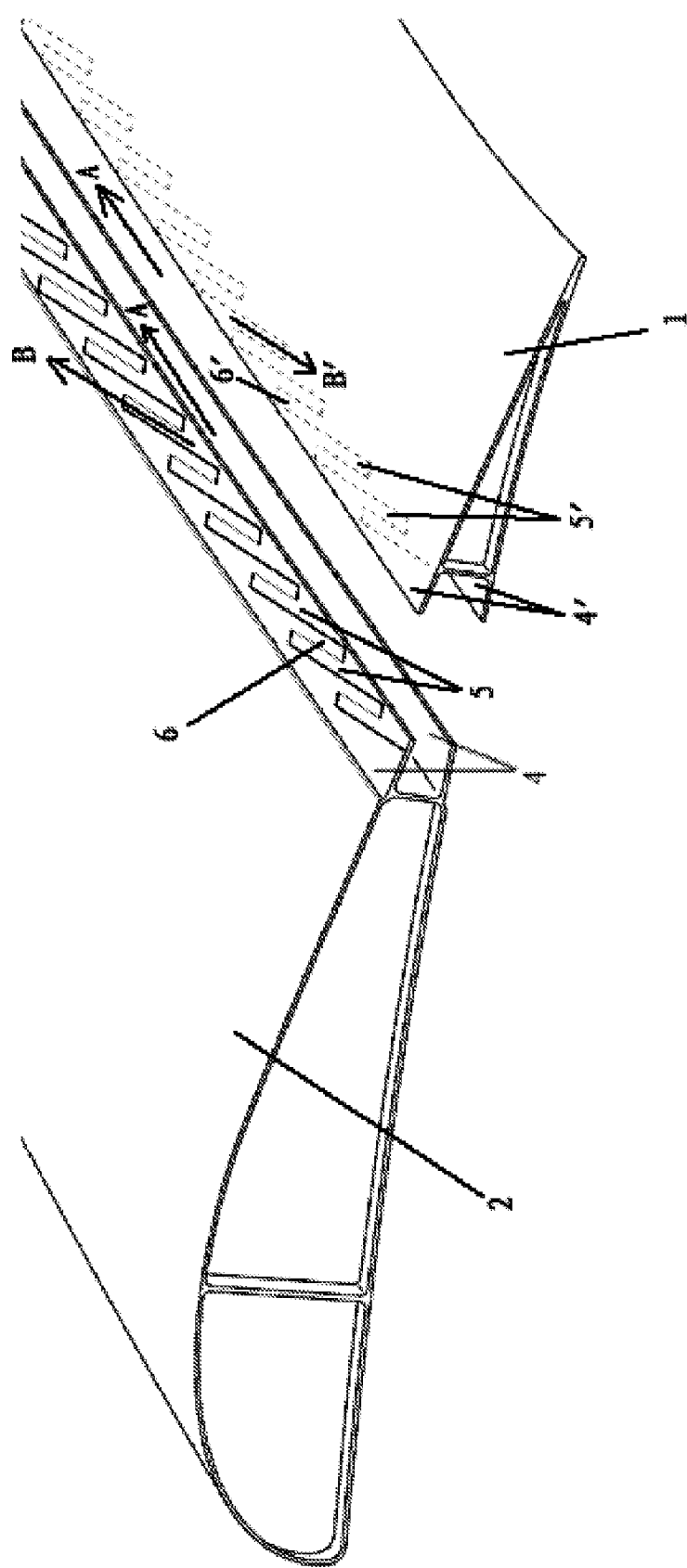
FIG. 2 shows the finger like grooves and the finger like protrusions provided in the connection means according to one embodiment of the disclosure.

A connection device according to one embodiment of the disclosure is shown in FIG. 2. The connection device may be used to connect a trailing edge of the flap of the airplane to main member of the flap of the airplane. As shown in FIG. 2, the trailing edge 1 of the flap and the main member 2 of the flap are provided with connection regions 4 and 4', which lengthwise extend in a direction A and are connected with each other, respectively. A plurality of finger-like grooves 5, which are parallel with each other and extend in a direction B inclined relative to the direction A in which the connection region 4 extends, are provided on an outer surface (forming a connection face with the connection region of the trailing edge of the flap after being fitted) of the connection region 4 of the main member 2 of the flap. The plurality of finger-like grooves 5 may be formed in such a manner that a finger-like protrusion 6 is formed between adjacent finger-like grooves 5. A plurality of finger-like grooves 5', which are parallel with each other and extend in a direction B' inclined relative to the direction A in which the connection region 4' extends, are provided on an inner surface (forming a connection face with the connection region of the trailing edge of the flap after being fitted) of the connection region 4' of the trailing edge 1 of the flap. The plurality of finger-like grooves 5' are formed in such a manner that a finger-like protrusion 6' is formed between adjacent finger-like grooves 5', wherein, the direction B' is just opposite to the direction B. When fitted, the finger-like protrusion 6' of the trailing edge 1 of the flap may be inserted into the corresponding finger-like groove 5 of the main member 2 of the flap, and the finger-like protrusion 6 of the main member 2 of the flap may be inserted into the corresponding finger-like groove 5' of the trailing edge 1 of the flap, thereby the trailing edge of the flap and the main member of the flap are fixedly connected.

As an alternative of the embodiment of the disclosure, the finger-like grooves 5 and 5' do not extend throughout the connection regions in a third direction substantially perpendicular with the direction A and the direction B or B', and the concave depths of the finger-like grooves 5 and 5' in the third direction are substantially identical.

As an instead of the embodiment of the disclosure, the finger-like protrusions 6 and the finger-like grooves 5 of the main member 2 of the flap also may be provided on the inner surface of the connection region 4, and the finger-like protrusion 6' and the finger-like groove 5' of the trailing edge 1 of the flap also may be provided on the outer surface of the connection region 4'.

Figure 3A:
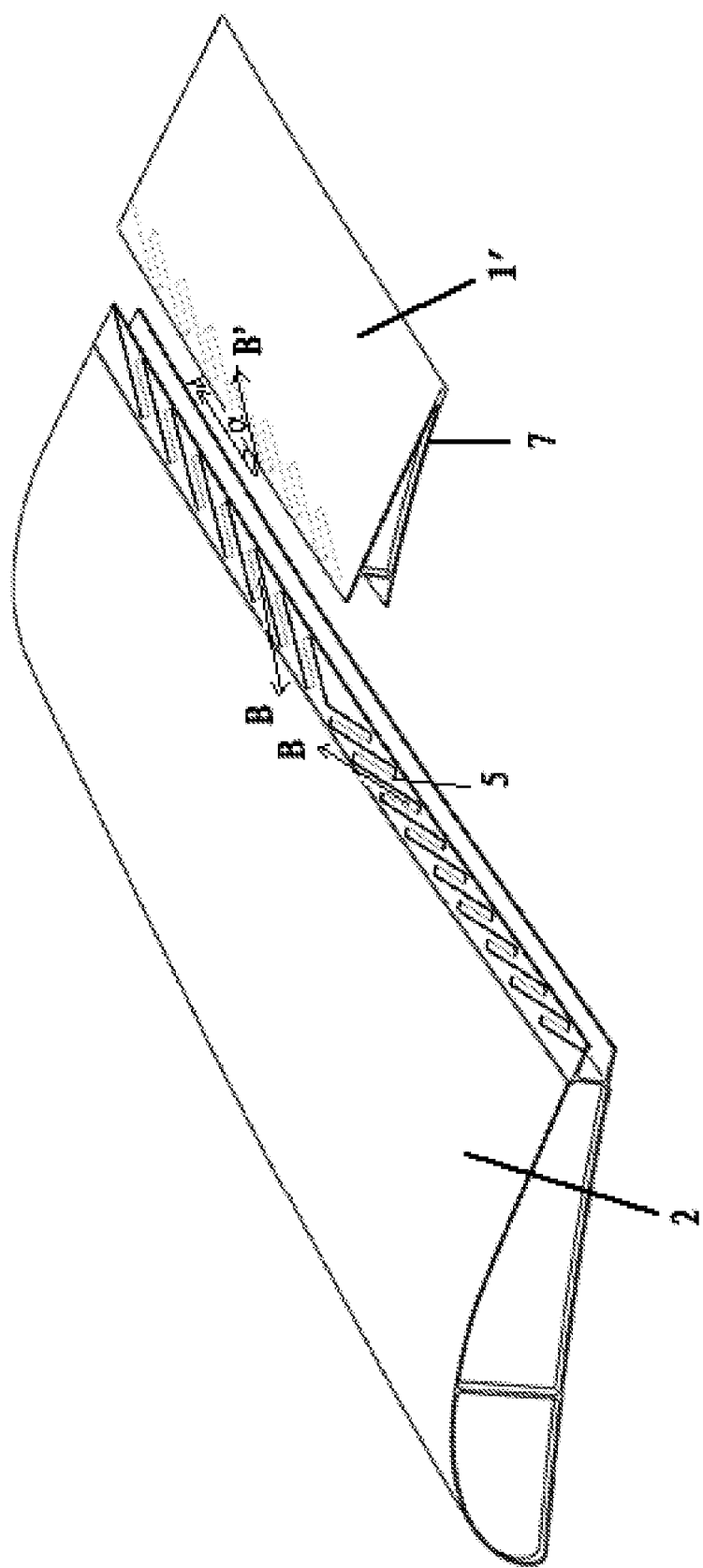
FIGS. 3a-3c shows the connection of the accessory means, which is designed into two segments in a lengthwise direction, with the main member.
Figure 3B:
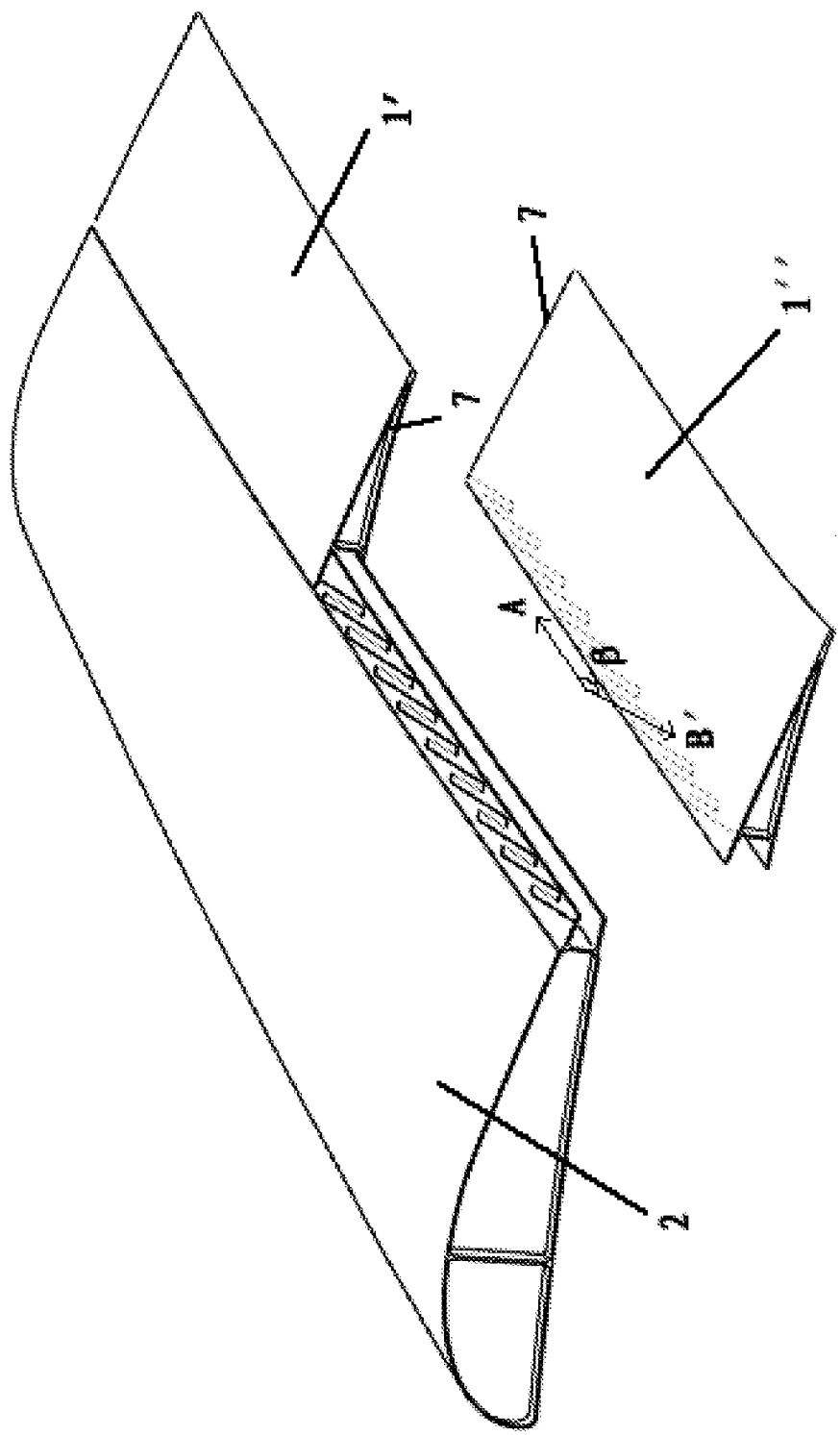
Figure 3C:
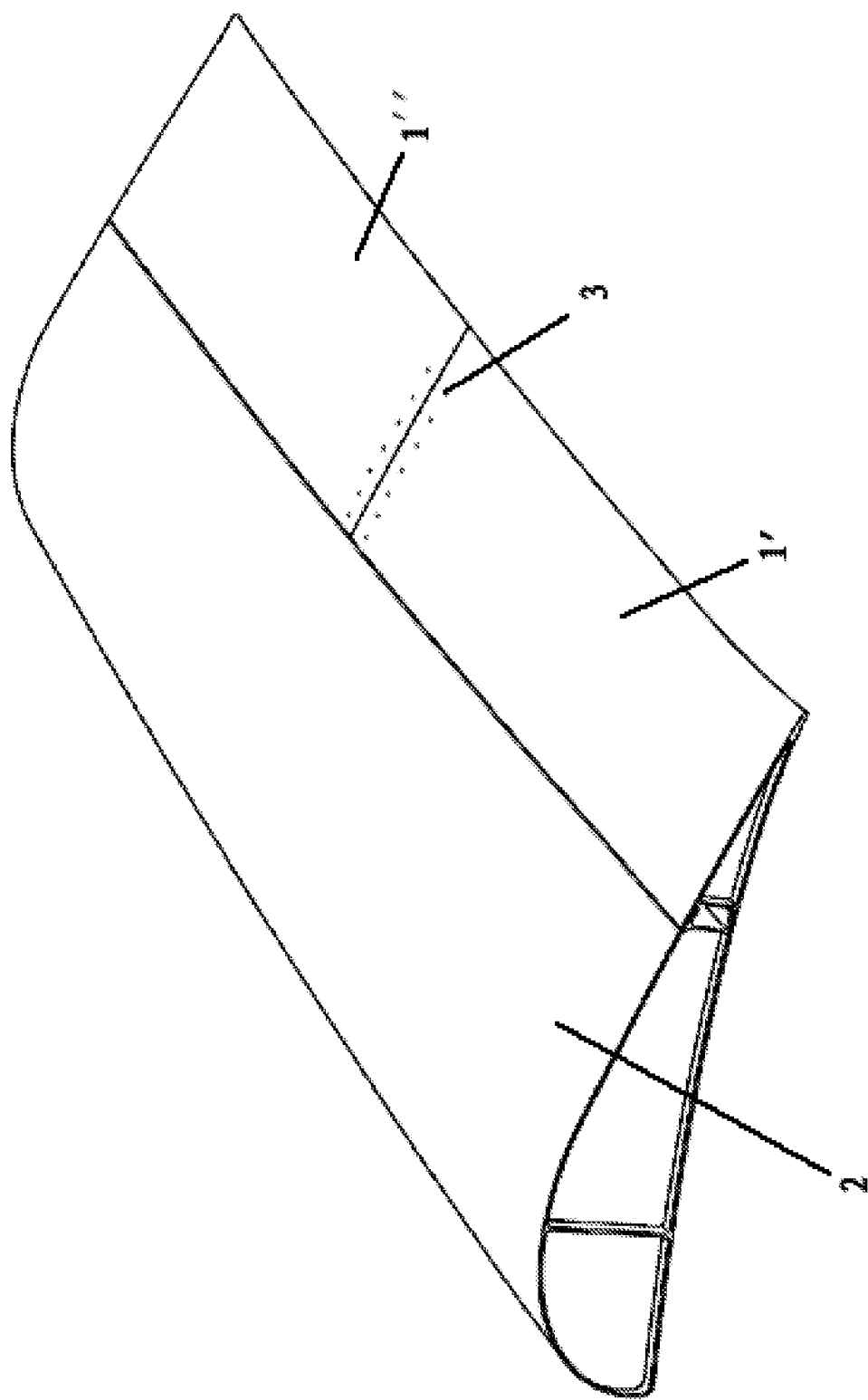

As shown in FIGS. 3a and 3b, in order to prevent the trailing edge of the flap from falling off, the trailing edge 1 of the flap is designed into at least two segments 1' and 1" in the direction A, and the angle between the direction B' and the direction A alternately changed in a acute angle α and an obtuse angle β in each segment. The at least two segments 1' and 1" are connected into one piece with rivets 3, as shown in FIG. 3c. As an example, the trailing edge of the flap may be designed into two segments 1' and 1". The direction B, in which the finger grooves 5 of the two portions, which are respectively corresponding to the two segments 1' and 1" of the trailing edge 1 of the flap, on the main member 2 of the flap extends, is toward the engaging face 7 between the two segments 1' and 1" of the trailing edge 1 of the flap, such that the two segments 1' and 1" of the trailing edge 1 of the flap are inserted into the main member of the flap, correspondingly, when fitted. The two segments 1' and 1" are fixed together to form a single piece with rivets 3. Alternatively, the rivets also may be other fasteners (for example, screws or bolts) or fixing means (for example, welding) other than rivets.

Figure 4:
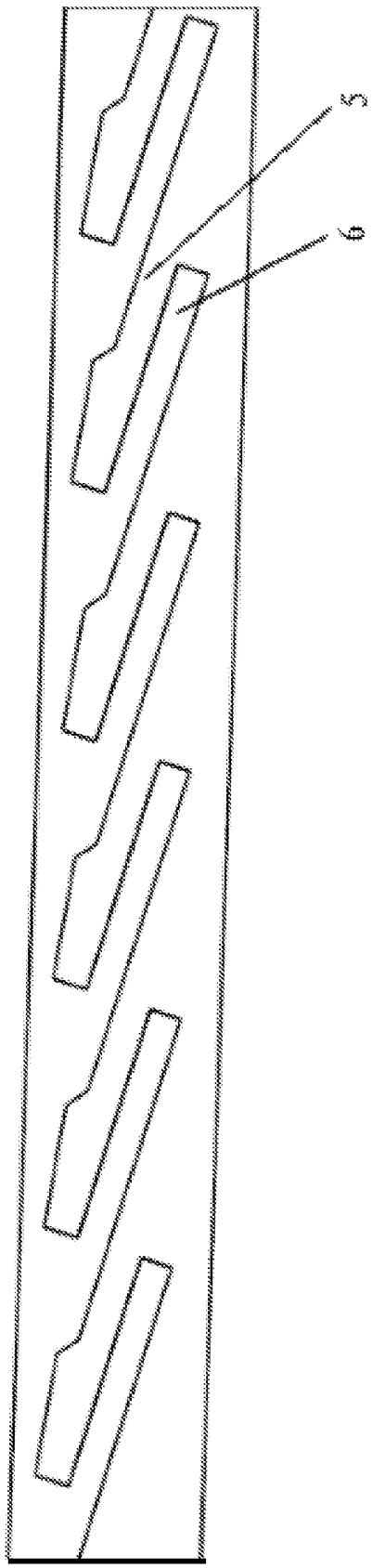
FIG. 4 shows another structure of the finger like grooves.

In addition, in order to further prevent the trailing edge of the flap from falling off, as shown in FIG. 4, the shape of the finger-like groove is designed such that the width of the finger-like groove 5 of the main member of the flap and the finger-like groove of the trailing edge of the flap become larger at the ends of the finger-like groove 5 of the main member of the flap and the finger-like groove 5' of the trailing edge of the flap in the direction B or B'. With the theory of thermal expansion and contraction, the main member of the flap and the trailing edge of the flap are kept at different temperatures, respectively when fitting. After being fitted, the temperatures will tend to be identical, and the sizes of the finger-like groove and the corresponding finger-like protrusion are adapted to be fitted together.

Figure 5:
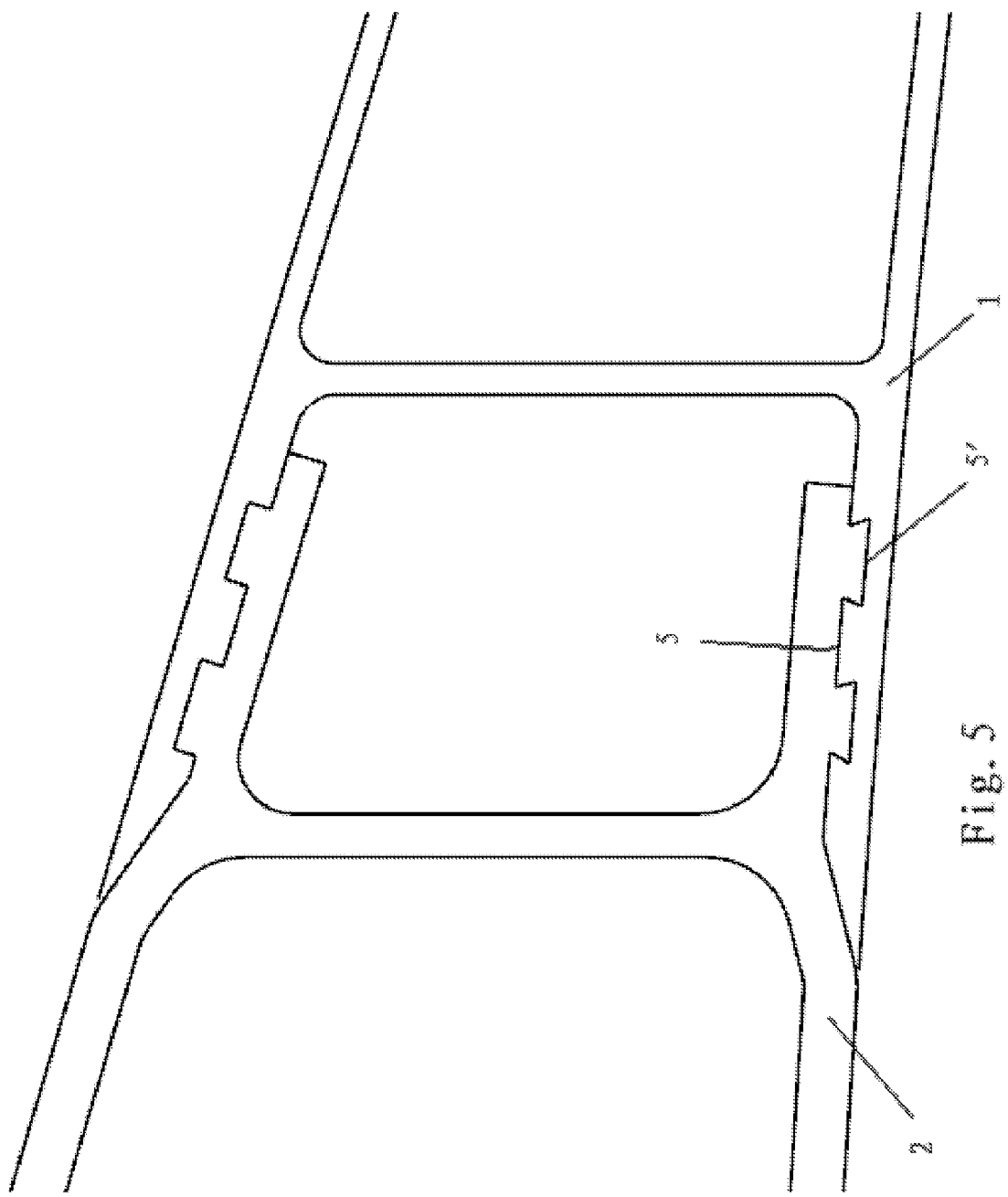
FIG. 5 shows the preferable cross-section shape of the finger like grooves.

As a further improvement to the embodiment of the disclosure, at the same time of using above groove-type insertion solution, the rivets may be mounted on the connection region in the direction A to increase the reliability of the whole structure. The number of the rivets will be largely lower than the number of the rivets when only using rivet-type connection alone. Alternatively, the rivets also may be other fasteners (for example, screws or bolts) or fixing means (for example, welding) other than rivets Further, As an alternative, as shown in FIG. 5, the shape of the cross-section of the finger-like grooves 5 and 5' may be arranged so as to provide an interference fit between the respective connection faces, for example, the cross-section shape may be dovetail or rectangular. The dovetail provided on the upper connection region and/or the lower connection region will be able to effectively prevent the trailing edge from falling off.

Figure 6:
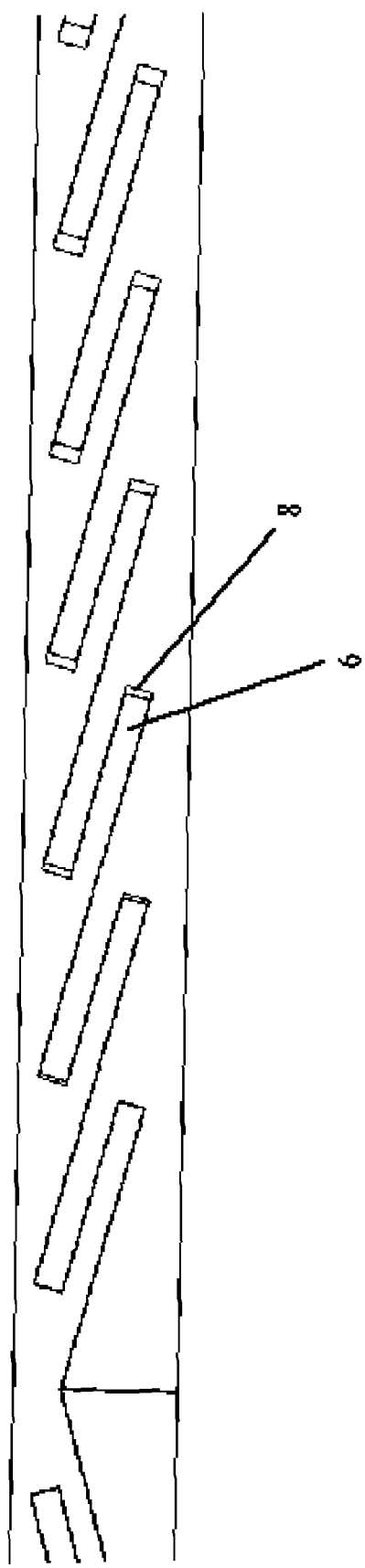
FIG. 6 shows the gaps between the ends of the finger like grooves and the inserted finger-like protrusions.

Moreover, since the flap will bend due to the external force after the airplane takes off, the finger-like grooves and the finger-like protrusions of the connection device will slip relative to each other. The magnitude of the slippage will gradually increase from the middle of the main member of the flap to the two ends of the main member in the direction A. Therefore, the loads applied to each rivet are different in the prior rivet-type connection solution. In the insertion-type solution of the present solution, as shown in FIG. 6, after fitted, there are gaps 8 between the ends of the finger-like groove of the main member of the flap and the finger-like groove of the trailing edge of the flap in the direction B or B', and the inserted corresponding finger-like protrusion, respectively. The sizes of the gaps gradually increase from the middle of the main member of the flap to the two ends of the main member in the direction A to compensate the distortion of the flap generated when the airplane flying, thereby the load is distributed evenly.

In the disclosure, the main member may be the main body of the flap, the aileron, the elevator or the rudder of the airplane, and the additional means may be the separable trailing edge of the flap, the aileron, the elevator or the rudder of the airplane. The accessory member may also be the fairing of the airplane, and the main member may be the main body with the fairing. Although the disclosure has been described by way of example and with reference to particular embodiments, it is to be understood that the disclosure is not limited to the embodiments explained in the description, and modification and/or improvements may be made without departing from the scope of the appended claims.

Where in the foregoing description reference has been made to integers or elements having known equivalents, then such equivalents are herein incorporated as if individually set forth.

LIST OF REFERENCE NUMERALS 1 a trailing edge of the flap
2 a main member of the flap
3 rivets
4 a connection region
5 and 5' finger-like grooves
6 and 6' finger-like protrusions
7 an engaging face
8 gaps

The invention claimed is:

1. A connection device for connecting first means of an airplane to second means of the airplane, the first means and the second means are provided with connection regions, which lengthwise extend in a first direction and are connected with each other, respectively, wherein, a plurality of finger-like grooves, which are parallel with each other and extend respectively in a second direction inclined relative to the first direction in which the connection region extends, are provided respectively on a connection face of the connection region of the first means and a connection face of the connection region of the second means, wherein the plurality of finger-like grooves are formed in such a manner that a finger-like protrusion is formed between adjacent finger-like grooves, when fitted, the finger-like protrusions of one of the first means and the second means are inserted into the corresponding finger-like grooves of the other one of the first means and the second means, thereby the first means and the second means are fixedly connected, wherein the first means is a main member, and the second means is an accessory member which is designed into at least two segments in a lengthwise direction of the accessory member, wherein the angle between the second direction and the first direction alternately changed in an acute angle $\alpha$ and an obtuse angle $\beta$ in each segment, and the at least two segments of the accessory member are fixed together to form a single piece, and wherein the accessory member is designed into two segments, wherein the second direction, in which the finger grooves of two portions, which are respectively corresponding to the two segments of the accessory member, on the main member extends, is toward an engaging face between the two segments of the accessory member, such that the two segments of the accessory member are inserted into the main member, correspondingly, when fitted.

2. The connection device according to claim 1, wherein the finger-like grooves do not extend throughout the corresponding connection regions in a third direction substantially perpendicular with the first direction and the second direction, and concave depths of the finger-like grooves in the third direction are substantially identical.

3. The connection device according to claim 1 wherein the shape of the cross-section of the plurality of finger-like grooves in a direction substantially perpendicular to the second direction is arranged so as to provide an interference fit between the respective connection faces.

4. The connection device according to claim 1, wherein the shape of the plurality of finger-like grooves is designed such that the width of the plurality of finger-like grooves become larger at the ends of the plurality of finger-like grooves in the second direction.

5. The connection device according to claim 1, wherein the first means and the second means are further connected together by fixing means in the connection region in the first direction.

6. The connection device according to claim 1, wherein after being fitted, there are gaps between the ends of the plurality of finger-like grooves in the second direction and the inserted corresponding finger-like protrusions, respectively, wherein the sizes of the gaps gradually increase from the middle of the main member to the two ends of the main member in the first direction.

7. The connection device according to claim 1, wherein the first means is a main body of a flap, an aileron, an elevator or a rudder of the airplane, and the second means is a separable trailing edge of the flap, the aileron, the elevator or the rudder of the airplane.

8. The connection device according to claim 1, wherein the second means is a fairing of the airplane, and the first means is a main body with the fairing.

* * * * *